Oct. 22, 1963 — T. J. O'DONNELL — 3,107,620
PROPELLENT GRAINS
Filed Oct. 20, 1959 — 3 Sheets-Sheet 1

INVENTOR
Thomas J. O'Donnell
BY Martha L. Ross
AGENT

Oct. 22, 1963  T. J. O'DONNELL  3,107,620
PROPELLENT GRAINS
Filed Oct. 20, 1959  3 Sheets-Sheet 2

INVENTOR
Thomas J. O'Donnell
BY Martha L. Ross
AGENT

Oct. 22, 1963
T. J. O'DONNELL
3,107,620
PROPELLENT GRAINS
Filed Oct. 20, 1959
3 Sheets-Sheet 3
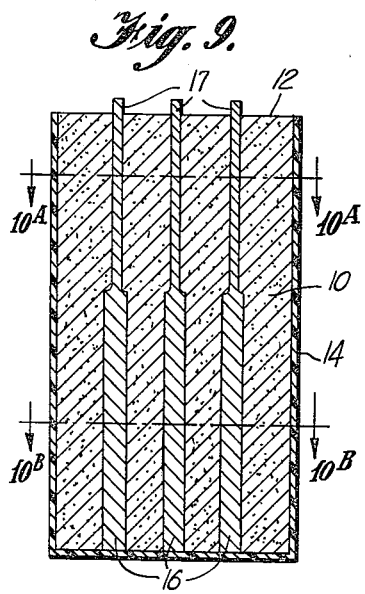
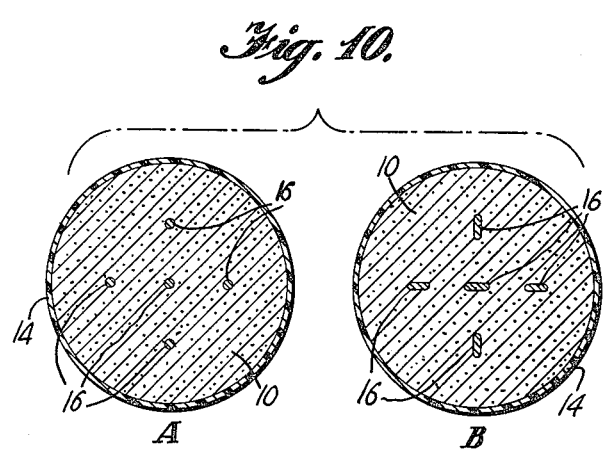
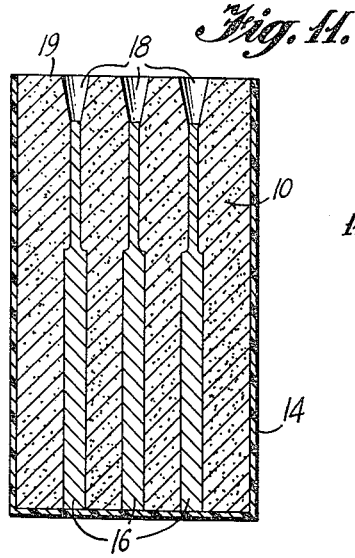
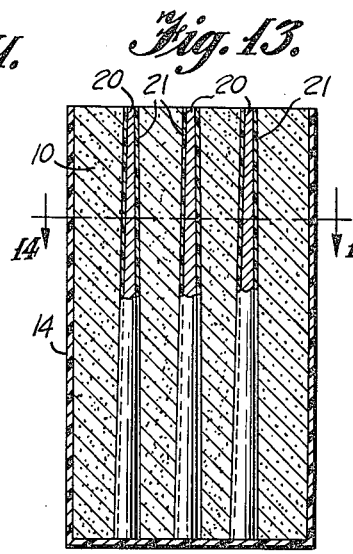
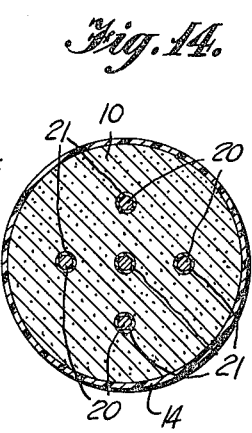
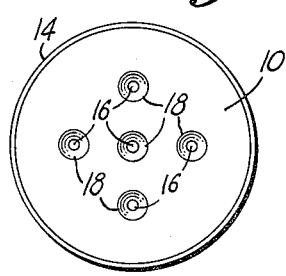
INVENTOR
Thomas J. O'Donnell
BY Martha L. Ross
AGENT 3,107,620
PROPELLENT GRAINS
Thomas J. O'Donnell, McLean, Va., assignor to Atlantic Research Corporation, Fairfax County, Va., a corporation of Virginia
Filed Oct. 20, 1959, Ser. No. 847,660
13 Claims. (Cl. 102—98)

This invention relates to new and improved propellent grains which, after ignition, produce predetermined, modulated mass rates of gas generation and thrust as they burn.

It is well-known that one of the factors determining thrust at any given point in the burning cycle of a propellent grain, in the area of burning surface at that point. Since a propellent grain, once made, is fixed in shape, any controlled, preprogramed variation in thrust desired after ignition could hitherto be achieved only by complex designing of the grain as by perforation or lateral recessing, difficult expedients which are limited in their range of effectiveness, or by varying other factors affecting thrust, such as wasteful side dumping of some of the combustion gases or turning rocket motor nozzles to an angle which reduces the vector producing forward thrust.

End-burning propellent grains containing embedded therein, in intimate, gas-sealing contact with the propellent matrix, elongated metal heat conductors, such as wires, positioned normal to the initial ignition surface of the grain and continuously disposed in the direction of flame propagation of the grain, have recently been introduced to the art. Such wired grains have eliminated the disadvantages of prior end-burning grains by greatly increasing burning surface area and, thereby, the effective mass burning rate and mass rate of gas generation to the degree requisite for high performance. The large burning surface area of the wired end-burning grains results from the fact that the propellent matrix burns at an exceedingly rapid rate along the metal heat conductor thereby producing recessing of the burning surface, with the wire at the apex of the formed recess. Thus the wired end-burning grains can now be employed in place of grains having longitudinal perforations or lateral recesses, expedients which are disadvantageous since they reduce grain strength and motor loading capacity.

Wired end-burning grains, like conventional end-burning grains, are generally cylindrical in shape, so that the cross-sectional area is the same throughout the length of the grain. Therefore, once the cone angle at the wire has reached equilibrium and, therefore, remains constant, the burning surface continues to regenerate over a constant area and, unless other conditions, such as pressure in the combustion chamber, are altered, as for example by the dumping of gases, thrust is substantially constant.

Preprogramed thrust modulation of such wired end-burning grains by varying the cross-sectional area along the length of the grain, as by tapering, poses certain difficulties and disadvantages, such as proper spacing of the wires and reduced propellent loading of the combustion chamber.

In many instances, however, it is desirable to build into a propellent grain the capacity to vary performance during flight in accordance with certain predetermined requirements or conditions. The required change in performance during the burning cycle of the grain may involve either an increase or a decrease in the mass rate of gas generation, with corresponding change in thrust, depending on the specific situation.

The object of this invention is to provide end-burning propellent grains containing embedded metal heat conductors continuously and longitudinally disposed in the direction of flame propagation in a plane normal to the initial ignition surface of the grains, which can be modulated to provide prescheduled, controlled changes in mass rate of gas generation during their burning cycles.

Still another object is to provide such preprogramed modulation without requiring any change in the cross-sectional area of the grain along its length.

Other objects and advantages will become obvious from the following detailed description and the drawings.

In the drawings, in which like parts in the several figures are identified by the same reference character:

FIGURE 1 comprises a diagrammatic series of longitudinal sectional views through a rocket motor showing a propellent grain in the combustion chamber and the effect of an embedded elongated metal heat conductor of varying ratio of cross-sectional area to perimeter along its length on the burning characteristics of the end-burning charge.

FIGURES 2, 3 and 4 are cross-sectional views taken respectively along lines 2—2, 3—3, and 4—4 of FIGURE 1A.

FIGURE 9 is a longitudinal section of another embodiment showing a plurality of metal heat conductors.

FIGURE 10 is a series of cross-sectional views taken respectively at 10A—10A and 10B—10B of FIGURE 9.

FIGURE 11 is a longitudinal section showing a recessed initial ignition surface.

FIGURE 12 is a plan view of the ignition surface of the grain of FIGURE 11.

FIGURE 13 is a longitudinal section of a grain containing a plurality of coated metal heat conductors.

FIGURE 14 is a cross-sectional view taken at 14—14 of FIGURE 13.

Figure 1:
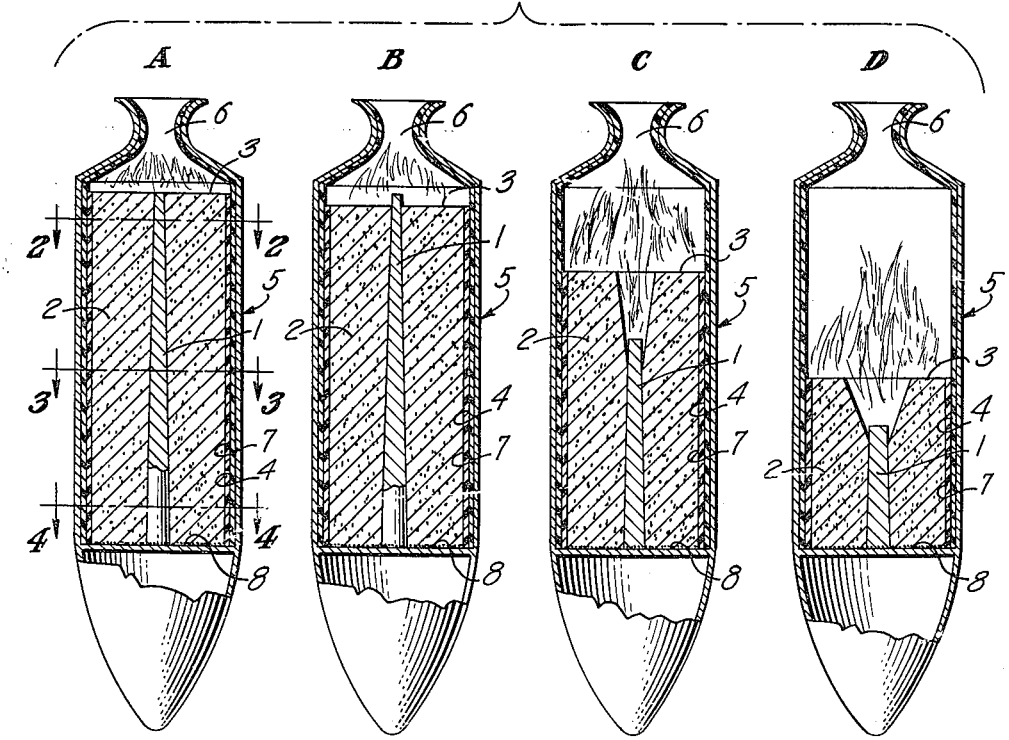

I have discovered that prescheduled modulation of the mass burning rate and, thereby, thrust, of an end-burning propellent grain containing longitudinally embedded elongated metal heat conductors can be achieved by the simple but effective expedient of varying the ratio of cross-sectional area of the metal heat conductor to the perimeter or boundary length of that area either continuously along the length of the conductor or at predetermined spaced points.

As aforementioned, the increase in mass burning rate of the grain stems from the increased burning rate of the propellent matrix along the metal heat conductor which produces recessing of the burning surface and, thereby, increased burning surface area. The more rapid the burning along the metal, the more acute is the angle of the recess formed with the metal conductor at the apex, and the greater is the burning surface area, mass rate of gas generation and thrust. A number of factors influence the rapidity at which the propellent matrix burns along the metal heat conductor, including the composition of the matrix itself and the heat conductivity or diffusivity of the particular metal used. In general the higher the thermal diffusivity of the metal, the greater is the effective increase in mass burning rate, with the melting point of the metal functioning as a modifying factor. Another important influencing parameter is the size of the heat conductor both in terms of its cross-sectional area and the amount of surface which it presents for transfer of heat to the propellent matrix.

The mass burning rate of a propellent grain containing an embedded elongated metal heat conductor changes with a change in the ratio of cross-sectional area to the perimeter of that area. By varying this ratio along the length of the metal heat conductor in a predetermined manner, the mass burning rate of the grain can be varied to the desired extent during the burning cycle, thereby modulating thrust or performance as required by the particular conditions of use. Such modulation can be in the direction either of increased or decreased thrust.

In general, the mass burning rate of the propellent grain increases with an increasing ratio of cross-sectional area to perimeter up to a maximum, which is very much higher than the linear burning rate of the propellent matrix without the metal heat conductor. The mass burning rate reaches a maximum at a certain value or range of values of that ratio, which varies with the particular metal, and then begins to decrease as the ratio continues to increase. It should be noted that the mass burning rate of the grain, though decreasing from the maximum, is still substantially higher than the normal linear burning rate of the propellent matrix. The peak mass burning rate in the case of metal heat conductors of circular cross-section is generally obtained at diameters in the range of about 2 to 5 mils depending on the particular metal. The rate of change of mass burning rate of the grain relative to the change of the ratio of cross-sectional area to perimeter of the metal heat conductor also varies with the particular metal and propellent matrix. These factors are, however, readily determined for any particular application by routine testing.

The metal heat conductor can be of any suitable cross-sectional shape, e.g., circular, rectangular, oval, or the like. The change in the ratio of cross-sectional area to perimeter can also be achieved in any suitable and convenient manner, as by increasing or decreasing the diameter of a round wire, flattening a portion of a wire of round, oval or rectangular cross-section to different thicknesses, and the like.

The effect on mass burning rate produced by wires of different ratio of cross-sectional area to perimeter is shown in the data summarized in Table I. The change in ratio was obtained here by employing wires of circular cross-section having different diameters as indicated. The summarized data also provides a comparison of the effect of wires of different metals. It will be noted that in all cases there is a marked change in effective burning rate with change in the wire dimensions and that the former increased to a peak and then decreased in volume as the diameter of the wire was increased. In the case of Cu, the increase in effective or mass burning rate as compared with the normal burning rate of the propellent matrix reached a maximum of 411% with a wire of 3 mil diameter and decreased to 378% when the diameter of the wire was increased to 5 mils. In the case of tungsten, the peak was also reached at about 3 mils. For Ag and Mb, the peak was at about 5 mils.

The propellent matrix was the same in all of the tests and consisted of 12.44% polyvinyl chloride, 74.63% ammonium perchlorate and 0.49% stabilizer.

Table I

COPPER

| Wire diameter, inch | Burning rate, in./sec.* | Increase in burning rate, percent |
|---|---|---|
| None | 0.46 | — |
| 0.001 | 1.12 | 142 |
| 0.002 | 1.80 | 291 |
| 0.003 | 2.35 | 411 |
| 0.005 | 2.20 | 378 |
| 0.007 | 2.10 | 357 |
| 0.010 | 1.78 | 287 |

SILVER

| | | |
|---|---|---|
| None | 0.44 | — |
| 0.001 | 0.81 | 84 |
| 0.003 | 1.80 | 309 |
| 0.005 | 2.20 | 400 |
| 0.007 | 1.86 | 323 |
| 0.010 | 2.08 | 370 |

TUNGSTEN

| | | |
|---|---|---|
| None | 0.46 | — |
| 0.001 | 1.10 | 140 |
| 0.003 | 1.63 | 254 |
| 0.005 | 1.55 | 237 |

MOLYBDENUM

| | | |
|---|---|---|
| None | 0.45 | — |
| 0.003 | 1.30 | 189 |
| 0.005 | 1.50 | 234 |
| 0.010 | 1.28 | 184 |

*At a combustion chamber pressure of 1000 p.s.i.

The ratio of cross-sectional area to perimeter of a given conductor embedded in a given propellent grain can be changed at predetermined spaced intervals along its length, thereby providing stepped changes, up or down as desired, in mass burning rate, or continuously, thereby providing a gradual and continuous change in the mass burning rate of the grain.

The metal heat conductor is preferably silver, copper, or aluminum, although it can be any other metal or metal alloy having good heat conductive properties, such as platinum, tungsten, magnesium, molybdenum, steel, and the like. As aforementioned, it must be in intimate, gas-sealing contact with the propellent matrix along its entire length within the grain. This intimate contact is essential to effectuate control of the burning rate of the matrix by means of the embedded metal conductor. Any spacing of the metal heat conductor from the propellent matrix as for example, such as would be produced by stringing a longitudinally perforated grain on a trap wire to hold it in position in the motor, results only in the establishment of a burning surface in the interior of the grain which ignites and then burns progressively away from the wire in an outward direction normal to both the perforation and the metal heat conductor at the normal linear burning rate of the propellent matrix. The metal heat conductor, in such a case, would not function to cause recessing and an increase in the mass burning rate, mass rate of gas generation or thrust.

Before the flame actively propagates along the metal heat conductor, a short length of the metal must protrude into the burning zone in order that it be heated to a sufficiently high temperature to provide the necessary heat transfer along its path to effect recessing of the burning surface. The length of protrusion varies with different metals and is determined by such factors as the thermal diffusivity and melting point of the particular metal. In general, the higher the thermal diffusivity, the shorter is the length of exposed conductor required before recessing occurs. For effective action, therefore, the metal heat conductor must be of sufficient length both to provide for the initial exposure into the flame zone and for propagation of the flame for some distance into the unburned propellant in which it is embedded. In general the minimum length of conductor required to achieve appreciable increase in the mass burning rate is about 0.08 to 0.1 inch and, preferably, about 0.2 inch.

The propellent matrix can be any suitable self-oxidant composition which, upon ignition, burns to produce propulsive gases, such as CO, $CO_2$, $H_2$ and $H_2O$. By "self-oxidant" is meant a composition which contains within itself an oxidizing component, such as oxygen, available for combustion of a fuel component of the composition. The propellent matrix can be, for example, of the double base type, such as nitrocellulose gelatinized with nitroglycerine, or of the composite type, such as a mixture of an organic fuel and a finely-divided inorganic solid oxidizer.

The matrix can be a conventional solid propellant or a plastic semi-solid. Cohesive, shape-retentive monopropellent compositions which are characterized as plastic or semi-solid because they flow at ambient or normal temperatures under moderate stress or pressure, can be loaded into the combustion chamber of a gas-generating device or rocket motor, where they function as end-burning grains. Such plastic monopropellent compositions generally comprise a stable dispersion of a finely-divided, insoluble, solid, inorganic oxidizer in a continuous matrix of an oxidizable organic liquid fuel. The physical properties of the plastic monopropellant, in terms of shape-retentive cohesiveness, tensile strength and thixotropy, can be improved by addition of a gelling agent or by using a liquid vehicle of substantial intrinsic viscosity, such as a liquid organic polymer. An example of a semi-solid monopropellent composition suitable for use as an end-burning grain is one consisting of 79.7% $NH_4ClO_4$, 12.1% dioctyladipate, 8.1% polyvinyl chloride (gelling agent), and 0.1% wetting agent, the percentages being by weight.

Figure 2:
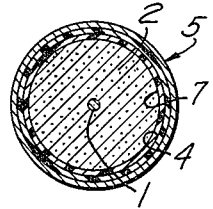
Figure 3:
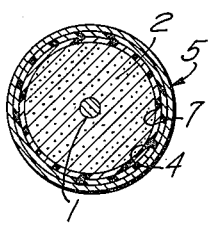
Figure 4:
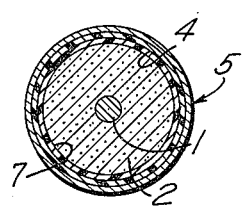

FIGURE 1 illustrates diagrammatically the burning phenomenon which occurs when a metal heat conductor 1 of circular cross-section and continuously increasing diameter (as shown in FIGURES 2, 3 and 4) is longitudinally embedded in end-burning propellent grain 2 in a plane normal to the initial ignition surface 3. For illustrative purposes, the propellent grain is shown in the combustion chamber 4 of rocket motor 5, equipped with restricted nozzle 6. The end-burning grain is inhibited on its lateral surfaces by inhibitor coating 7 and on its forward end by plastic cement bonding 8. The entire surface of metal heat conductor 1 is embedded in intimate, gas-sealing contact with the propellent matrix.

In FIGURE 1A, the grain has just been ignited. In FIGURE 1B, the burning surface has regenerated at the normal burning rate of the propellent matrix until a portion of metal heat conductor 1 protrudes beyond the burning surface into the hot combustion gases. The exposed metal is heated to a high temperature by the hot gases and this heat is then conducted by the wire into the propellent matrix adjacent to the metal and to the burning surface. Burning then proceeds rapidly along the wire with recessing of the burning surface to form a recess with the metal conductor at the apex, as shown in FIGURES 1C and 1D.

In this illustration, the change in ratio of cross-sectional area of the conductor to the periphery of that area is within the range in which increase in the ratio produces a decrease in the burning rate along the conductor. The higher burning rate in 1C is shown by the more acute angle at the apex and, therefore, the larger burning surface area, than that in 1D. In the embodiment shown in FIGURE 1, the mass burning rate and, therefore, thrust are progressively reduced during the burning cycle in a controlled and prescheduled manner.

Figure 5:
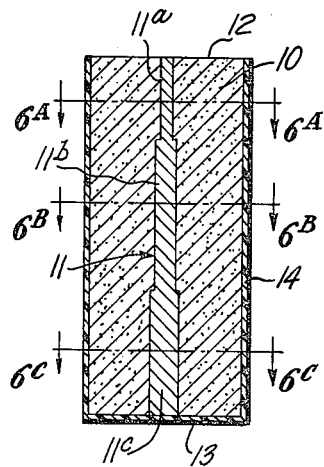
FIGURE 5 is a longitudinal sectional view showing a modified metal heat conductor.
Figure 6:
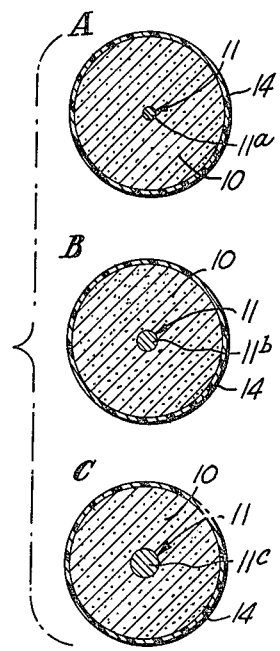
FIGURE 6 is a series of cross-sectional views taken respectively at 6A—6A, 6B—6B, and 6C—6C of FIGURE 5.

FIGURE 5 illustrates an end-burning propellent grain 10 inhibited with coating 14 designed to provide preprogrammed stepped performance by means of metal heat conductor 11. In this case portions 11a, 11b and 11c are each of a constant, circular cross-section, which increases progressively from portion to portion along the length of the conductor from the rear ignition surface 12 of the grain to its forward end 13. With the ratio of cross-sectional area to perimeter of portion 11a within the range in which increase in the ratio produces increase in the effective burning rate, this ratio in the case of portion 11b being at the peak of the curve, and the ratio in the case of 11c being within the range in which increase in the ratio induces a decrease in effective burning rate, the effective, prescheduled thrust of this grain during its burning cycle will increase when burning along the metal progresses from portion 11a to 11b and will decrease when it progresses from portion 11b to 11c.

Figure 7:
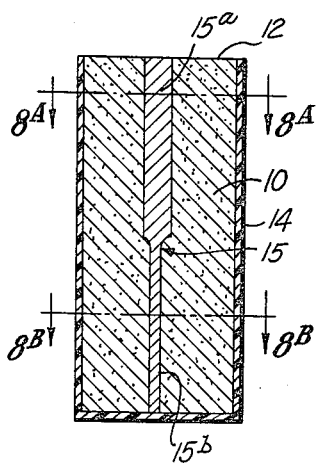
FIGURE 7 is a longitudinal section showing still another modification.
Figure 8:
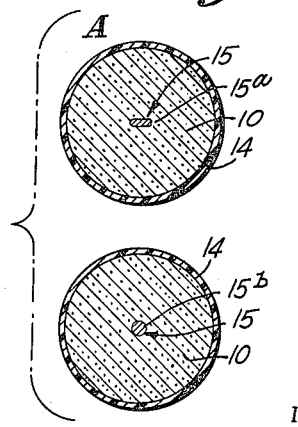
FIGURE 8 is a series of cross-sectional views taken respectively at 8A—8A and 8B—8B of FIGURE 7.

In the end-burning grain 10 illustrated in FIGURE 7, the metal heat conductor 15 comprises a flattened ribbon portion 15a and portion 15b of circular cross-section. Portion 15a has a smaller ratio of cross-sectional area to perimeter than does portion 15b. If the relationships between these ratios is within the range at which increase in the ratio produces an increase in effective burning rate, thrust will increase as burning proceeds along the conductor from portion 15a to 15b. The increase will be a step-wise one since each portion is constant with respect to this ratio. If the relationship is within the range at which mass burning rate decreases with increase in the ratio, the converse situation will prevail.

In most cases and, particularly where the propellent grain has a relatively large cross-sectional area, it is desirable to embed a plurality of the metal heat conductors 16 longitudinally at spaced intervals, as shown in FIGURES 9 and 10. If a propellant grain contains only a single metal heat conductor, as shown in FIGURE 1, the peripheral portion of unburned propellant remaining when burning has progressed the full length of the metal may be larger than is desirable. This can be avoided by introducing a plurality of conductors.

It is also frequently desirable to achieve or approach the equilibrium burning surface, namely the maximum recessing produced by the metal conductor, as quickly as possible. The use of a plurality of conductors, as shown in FIGURE 9, greatly increases the rapidity with which this can be accomplished, since the recesses incident to the metal conductors soon intersect at their flaring ends. Although the apex angle of the recess for each of a plurality of conductors is the same as for a single conductor of the same size and shape embedded in a grain, the depth of the recessed cones is shorter in the case of the plurality of conductors, so that overall burning surface is not inactuality increased.

The equilibrium state can also be approached more rapidly by exposure of the metal heat conductors a short distance beyond the initial ignition surface, as shown at 17 in FIGURE 9, or by prerecessing the initial ignition surface with the metal heat conductor exposed at the apex of the recess, as illustrated by coned recesses 18 in initial ignition surface 19 in FIGURES 11 and 12.

As aforedescribed, upon ignition, the grain burns for a short distance at the normal rate of the propellent material itself until a short length of the metal protrudes into the hot combustion gas zone before the flame propagates along the metal heat conductor. Initial protrusion of the conductor, therefore, more quickly initiates the desired rapid flame propagation.

Prerecessing of the ignition surface also eliminates at least a portion of the progressivity produced when the burning surface regenerates from an initial plane ignition surface to its maximum recessed state along the metal heat conductors.

The embedded bare metal heat conductors make possible increases in effective burning rate which are as much as 3 to 5 times larger than that of the propellent matrix itself. Variation in effective or mass burning rate and, thereby, thrust modulation, can be prescheduled in a given propellent grain within the range determined by the maximum rate obtainable with the bare metal conductor and that of the matrix itself without the metal, by varying the ratio of cross-sectional area to perimeter of the longitudinally oriented conductor.

There are situations as, for example, in the field of rocketry, requiring for optimum performance both the high loading density obtainable with end-burning grains and even higher mass burning rates than those made possible by the embedding of the bare metal heat conductors.

A considerably greater increase in mass burning rate can be obtained by coating the bare metal heat conductor with a solid, self-oxidant composition of higher linear burning rate than that of the propellent matrix. The solid, self-oxidant coating must adhere in intimate contact with the metal, and the metal coating, after introduction into the grain matrix, must be in intimate contact throughout with the grain matrix for the same reason discussed above in connection with the bare metal heat conductors.

The increase in mass burning rate and rate of gas generation obtained by coating the metal heat conductor with a solid, self-oxidant composition of higher burning rate than that of the propellent matrix can be several times greater than that obtained with the bare metal conductor. The extent of the increase appears largely to be determined by the relative burning rates of the matrix and the coating, the higher the burning rate of the coating relative to that of the matrix, the larger generally being the increase in mass burning rate of the grain. Thus within maximum limits imposed by available maximum burning rates of suitable self-oxidant coating compositions, the mass burning rate of the propellent grain can be tailored to desired levels above the obtainable with the bare metal conductor.

In some applications, it is advantageous to employ end-burning grains having mass burning rates which are substantially higher than that of the propellent matrix but not as high as those ordinarily obtained by incorporation of the bare metal conductor. Such controllable, intermediate mass burning rates can be achieved by coating the bare metal conductor with a solid, self-oxidant coating, as aforedescribed, except that the coating composition has a substantially lower linear burning rate than that of the propellent matrix.

Maximum mass burning rate intermediate that of the propellent matrix with and without a given embedded bare metal conductor can also be obtained by coating the metal with a composition which has a substantially lower heat conductivity than the metal and which is inert, namely not self-oxidant. Adjustment of the mass burning rate to any desired intermediate level can be achieved by proper formulation or choice of the coating composition.

Since the inert coating composition, unlike the propellent matrix, is not self-oxidant, namely does not contain within itself oxygen is substantial amounts available for self-combustion, it functions primarily as an insulator which diminishes heat transfer from the metal heat conductor to the propellent matrix. The degree to which the heat transfer is reduced is determined largely by the particular insulating properties of the composition and the thickness of the coating.

Prescheduled variation in mass burning rate, mass rate of gas generation, and thrust during the burning cycle of a given end-burning propellent grain containing embedded metal heat conductors coated, as aforedescribed, with a self-oxidant coating of different linear burning rate from that of the propellent matrix or with an inert coating, can be obtained by predetermined variation of the cross-sectional area of the metal heat conductor to its perimeter at different points along its length in the grain. The modulation thus achieved will be between the peak mass burning rate obtainable with the given metal and coating and the linear burning rate of the propellent matrix.

Self-oxidant coatings having a higher or lower burning rate than that of the propellent matrix can readily be formulated by those skilled in the art. It can, for example, be nitrocellulose plasticized with nitroglycerine with or without modification by the addition of an inert plasticizer, such as triacetin, and an inorganic oxidizer, such as ammonium perchlorate. It can also comprise a mixture of an inert (namely non-self-oxidant) organic polymer, such as polyvinyl chloride, with an inorganic oxidizer, such as the $NH_4$, K, or Na perchlorates or nitrates, with or without the addition of other fuel components, such as finely divided metal powders, e.g., Al or Mg, burning rate catalysts and the like.

The insulator coating material can be substantially any non-self-oxidant composition which is characterized by substantially lower heat conductivity than the metal heat conductor and which adheres to the metal in the form of a continuous, homogeneous film. Coatings which comprise a polymer, at least in part, are especially suitable both because of their heat insulating properties and their usually excellent film forming ability. Such polymers include, for example, cellulose acetate, ethyl cellulose, polyvinyl chloride, phenol-formaldehyde, urea-formaldehyde, natural and synthetic rubbers, polyamides, dimethyl siloxane, and the like. Plasticizers can be incorporated into the polymers in conventional manner to improve workability and film-forming properties. Such plasticizers include, for example, phthalates, sebacates and adipates, such as the dimethyl, dibutyl, and dioctyl derivatives, organic phosphate esters, such as tri-butoxyethyl phosphate and the like. Finely divided solids, such as silica, bentonite, and asbestos can be incorporated into the coatings to influence their insulating properties. The coatings can also be inorganic compositions, such as fused metal oxides, glass, or ceramic. An example of an excellent enamel frit coating is the National Bureau of Standards Ceramic Coating A–418 which, after fusion of a $SiO_2$, $BaCO_3$, $H_3BO_3$, $CaCO_3$, ZnO, hydrated $Al_2O_3$ and $ZrO_2$ mixture onto the metal conductor, forms an adherent boro-silicate film.

The various coating compositions can be prepared and applied to the metal heat conductor of predetermined, varied ratio of cross-sectional area to perimeter in any desired manner, as by dipping or spraying. In some cases, it may be desirable to fluidify the coating prior to application by addition of a volatile solvent which is removed by volatilization after the coating is applied. In some instances it will be necessary to heat the coated metal to polymerize applied monomeric or partially cured polymeric materials, to dissolve the polymer in plasticizer to form a solid gel, or to fuse the applied materials.

FIGURES 13 and 14 illustrate end-burning propellent grain 10 having embedded therein longitudinally disposed wire conductors 20, of continuously increasing ratio of cross-sectional area to perimeter, having coating 21, which can be self-oxidant or non-self-oxidant. Both types of coatings can be applied to metal heat conductors of any configuration, such as those illustrated in FIGURES 5 and 7.

I claim:
1. A propellent grain, said grain being designed to burn progressively from one end which is an initial exposed ignition surface and comprising a self-oxidant propellent matrix, the combustion of which generates propellent gases, said matrix containing embedded therein an elongated metal heat conductor positioned substantially normal to said initial ignition surface of said grain and being continuously disposed in the direction of flame propagation of the grain, the length of the conductor embedded within the body of the grain being at least about 0.08 inch, the entire surface of said embedded length being in intimate, gas-sealing contact with the propellent matrix, said embedded elongated metal heat conductor varying in the ratio of its cross-sectional area to perimeter in preselected manner and in appreciable amount along its length, the burning surface of said grain after ignition regenerating progressively along said metal heat conductor and, in so doing, forming a recess which is substantially V-shaped in at least one plane with said metal heat conductor at the apex of the thus formed recess, said recess changing in burning surface area at a given combustion chamber pressure with the preselected variation in said ratio of cross-sectional area of said conductor to perimeter, the metal heat conductor thereby serving controllably and in a predetermined and preselected manner to vary appreciably the mass burning rate and, thereby, the mass rate of gas generation of the propellant grain.

2. The propellant grain of claim 1 containing a plurality of said elongated metal heat conductors in spaced relationship each to the other, the embedded length of each of said conductors being at least about 0.2 inch.

3. The propellant grain of claim 1 in which the metal heat conductors are continuous substantially throughout the distance of flame propagation of the grain.

4. The propellant grain of claim 2 in which one end of each of said metal heat conductors is exposed at said initial ignition surface of said grain.

5. The propellant grain of claim 2 in which one end of each of said metal heat conductors is exposed at the apex of a recess in said initial ignition surface.

6. The propellant grain of claim 1 in which the metal heat conductor is coated with a solid, self-oxidant coating composition having a normal linear burning rate different from the normal linear burning rate of the propellant matrix, and the entire surface of the coated metal heat conductor lying within the body of the propellant grain is in intimate gas-sealing contact with the propellant matrix.

7. The propellant grain of claim 2 in which the metal heat conductors are coated with a solid, self-oxidant coating composition having a normal linear burning rate different from the normal linear burning rate of the propellant matrix, and the entire surface of the coated metal heat conductors lying within the body of the propellant grain is in intimate, gas-sealing contact with the propellant matrix.

8. The propellant grain of claim 7 in which the metal heat conductors are coated with a solid, self-oxidant coating composition having a normal linear burning rate higher than the normal linear burning rate of the propellant matrix.

9. The propellant grain of claim 8 in which the coated metal heat conductors are continuous substantially throughout the distance of flame propagation of the grain.

10. The propellant grain of claim 8 in which one end of each of said coated metal heat conductors is exposed at said initial ignition surface of said grain.

11. The propellant grain of claim 8 in which one end of each of said coated metal heat conductors is exposed at the apex of a recess in said initial ignition surface.

12. The propellant grain of claim 1 in which the metal heat conductor is coated with a solid, inert composition characterized by substantially lower heat conductivity than the metal, and the entire surface of the coated metal heat conductor lying within the body of the propellant grain is in intimate, gas-sealing contact with the propellant matrix.

13. The propellant grain of claim 2 in which the metal heat conductors are coated with a solid, inert composition characterized by substantially lower heat conductivity than the metal, and the entire surface of the coated metal heat conductors lying within the body of the propellant grain is in intimate, gas-sealing contact with the propellant matrix.

References Cited in the file of this patent

UNITED STATES PATENTS

| 2,548,926 | Africano | Apr. 17, 1951 |
| 2,637,274 | Taylor | May 5, 1953 |

FOREIGN PATENTS

| 652,542 | Great Britain | Apr. 25, 1951 |
| 742,283 | Great Britain | Dec. 21, 1955 |